June 25, 1929.  E. K. BAKER  1,718,916
INTERCHANGEABLE DEMOUNTABLE WHEEL
Original Filed July 2, 1921   2 Sheets-Sheet 2
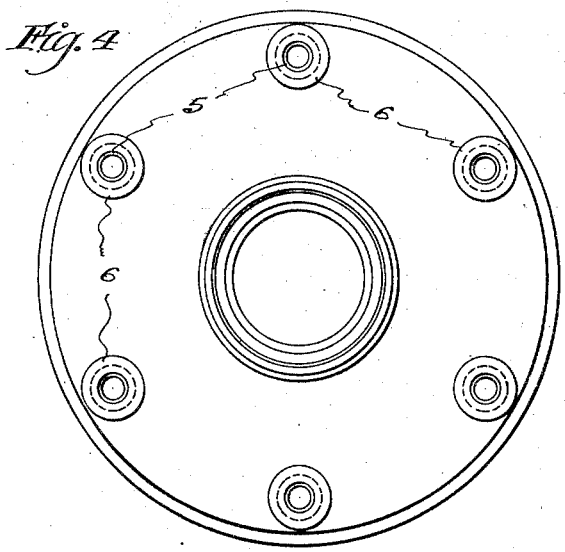
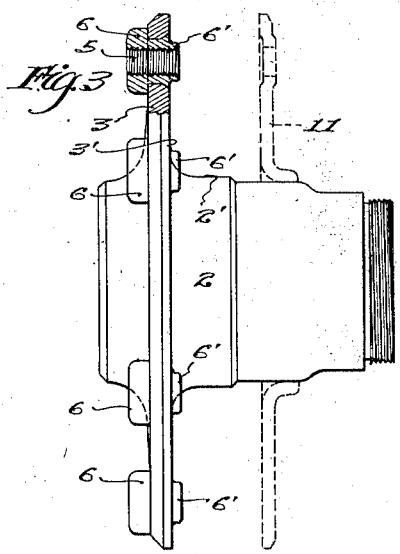
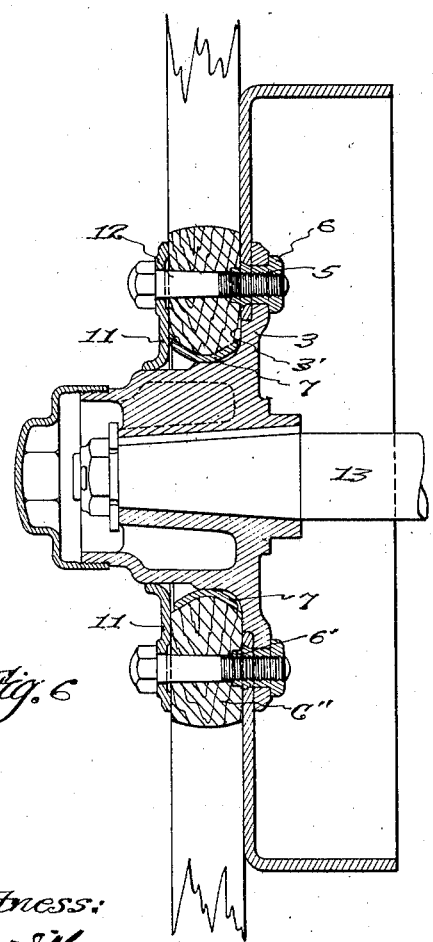
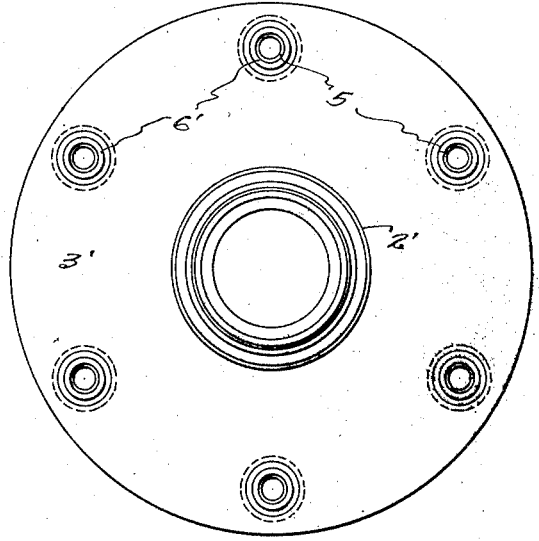
INVENTOR
Erie K. Baker
BY
ATTORNEY
Witness:

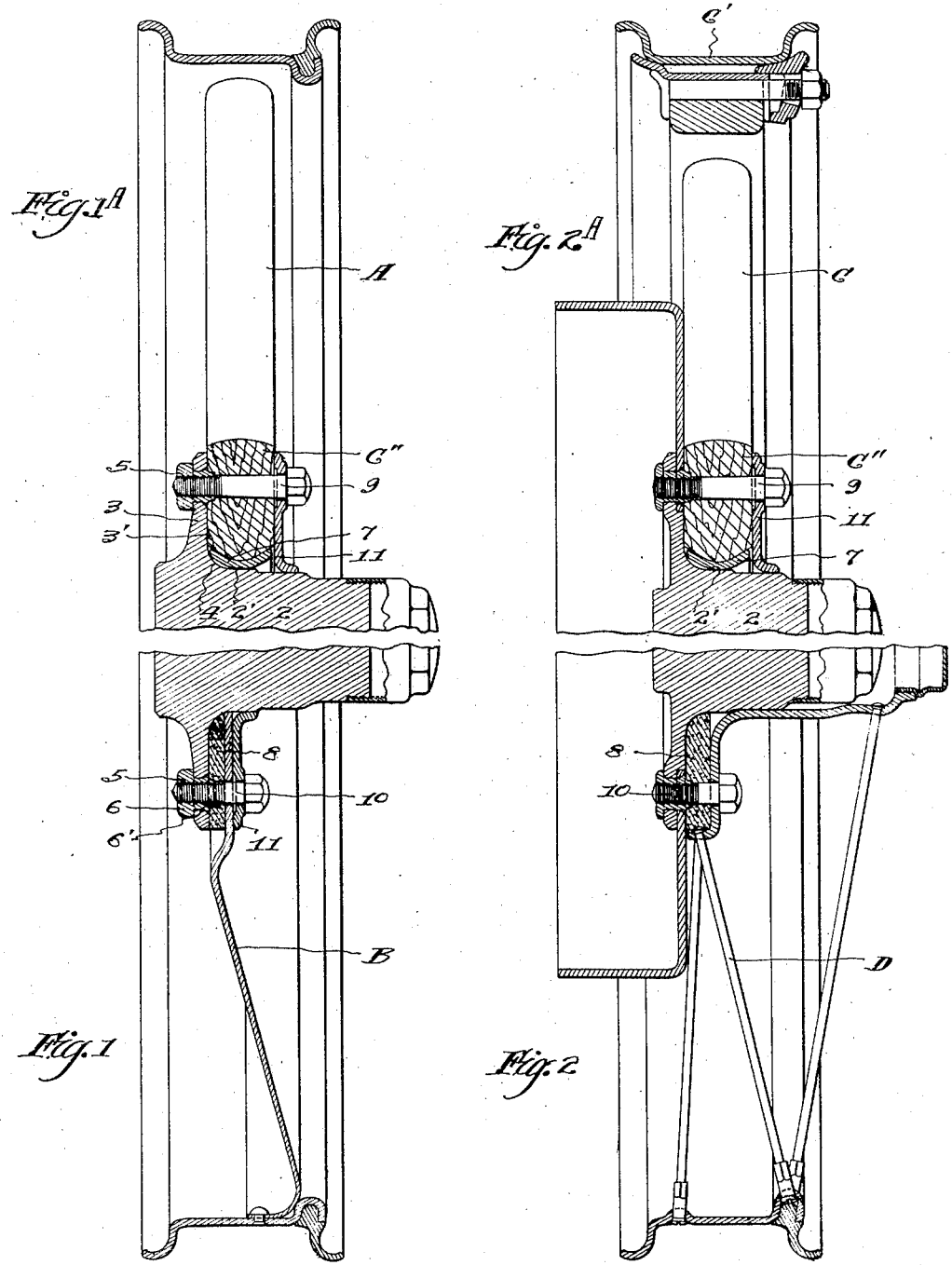

Patented June 25, 1929.

1,718,916

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

INTERCHANGEABLE DEMOUNTABLE WHEEL.

Original application filed July 2, 1921, Serial No. 482,098. Divided and this application filed November 2, 1928. Serial No. 316,650.

This application is a division of my co-pending application Serial Number 482,098; filed July 2, 1921, entitled Interchangeable demountable wheels.

My invention relates to improvements in motor vehicle wheels, and its objects is greatly to improve the relation between the hubs and wheels of a motor vehicle and permit an entirely satisfactory interchange of any wheel, for another of the same or a different type.

My novel hubs are made of metal and are chiefly characterized by a construction which gives the same size to all hubs and wheels of the vehicle; which permits the wheels to be placed on the hubs and removed therefrom with the greatest ease; and, assists in attaching the wheels to the hubs in a manner that definitely prevents looseness between the parts, thereby obviating the rapid wear which has objectionably distinguished other so-called demountable wheels.

The novel wheels of my invention likewise treated as belonging to a given vehicle, are characterized by a common hub hole size; by a hub-barrel bearing of such limited extent as to permit the easy disengagement of the wheel; and by a non-metallic hub flange engaging portion which is slightly compressible for the purpose of automatically locking the hub bolts and which ensures enough friction between the hub flange and the wheel to prevent slippage between them while the wheel is bolted on the hub. This last mentioned friction grip to prevent slippage is not claimed in this application as it is claimed in my co-pending application Serial Number 482,098 of which this application is a division.

Various other objects and features of my invention will appear hereinafter.

In structure, my invention is extremely simple and will be readily understood on reference to the accompanying drawings in which Figs. 1 and 1ᴬ and 2 and 2ᴬ disclose my novel front and rear hubs and four different types of wheels that are interchangeable thereon; Fig. 3 is an enlarged view of a hub by itself; Fig. 4 is an inner end view thereof; Fig. 5 is an outer end view of the same; and Fig. 6 is a sectional view through hub and wheel.

On reference to the various parts of the drawing, it will be seen that my metal hubs possess the advantage of having the same appearance as motor vehicle wheel hubs of the type in most general use; but at the same time my hubs differ from the latter in several important respects. Each hub comprises a barrel portion 2, shaped to suit the spindle or axle and bearings which it is intended to receive. At the rear or inner end of the barrel is an outstanding hub flange 3. Generally the juncture between the base of the flange 3 and the barrel 2 is marked by a small fillet 4. Spaced at equal distances in the hub flange 3 are a plurality of threaded openings 5, intended to receive the hub bolts by which the wheels are attached thereto. These threaded openings are preferably formed in the separately inserted and upset nuts 6 held against turning in the flange. These will be found detailed in Figs. 3, 4, 5 and 6. Preferably the outer end 6' of each nut projects beyond the face 3' of the back flange 3 so that the several projecting nuts may interlock with the wheel. A distinguishing characteristic is found in the wheel-centering and supporting portion 2' of the hub. Every part outward of the portion 2' is of smaller diameter so as not to interfere with the placing and the removal of the wheel.

It should be at once understood that Figs. 1, 1ᴬ, 2 and 2ᴬ are views showing but one-half of a wheel in each instance, several types being shown. Thus Fig. 1ᴬ depicts the wheel A of my earlier Patent No. 1,334,011, known as the Baker semi-wood wheel. Fig. 1 is devoted to my improved wheel B of the metal disk type. Fig. 2ᴬ represents a wheel C of the so-called standard wood type, bearing a demountable rim C' and Fig. 2 depicts my improved wire wheel D.

Each wheel contains a central hub hole of a size to closely fit an abbreviated or limited portion of the hub which serves to center the wheel on the hub.

All of my wheels are distinguished by what may be termed a metal or metalized center hub hole. Thus the wooden wheels A and C with their hub centers C'' have hub holes which are faced by metal spoke-interlocking rings 7, of the kind appearing in the Hawley Patent No. 1,399,719, issued on Dec. 6, 1921. Those are of such strength as to prevent change of size in the hub hole of the wheel, and have relatively abbreviated, really a rocking bearing upon the hub portion 2'. The hub centers of the metal wheels, B and D, being composed of metal do not require any additional part.

In certain of the views friction material 8 is shown between the wheel and adjacent hub portion. This friction material is also of value in that it prevents the drumming of the wheel and eliminates the generation of noises which are objectionable in some wheels, especially in disc wheels. Being out of metallic contact with the hub flange the transmission of vibrations and noise is eliminated or greatly reduced. This feature, however, is not claimed in this application as it is claimed in the parent application, Serial Number 482,098, supra, of which this is a division.

The friction disks or rings 8, may be loose but better still are attached to the metal hub centers of their wheels to prevent loss. I do not find it practical to leave the disks 8 upon the wheel hubs, it being clear that the disks should accompany the wheels when removed from the hubs and leave the latter free to receive a wheel of the type A or C.

The wheels are attached to the hub by means of a plurality of hub bolts; either long as shown at 9 for a wood wheel; or short, as shown at 10, for a metal wheel. Before these bolts are inserted a ring or outer hub flange 11 is put in place against the wheel. Such hub flanges are used with wheels of the types A, B, and C. No hub flange is required for a wheel of the type D. The heads of the bolts are presented on the outer face of the wheel and the threaded ends of the bolts enter the fixed nuts 6, in the back flange of the hub.

A distinguishing characteristic of my hub bolt 12 is that it is slightly tapered. The hole in the outer removable hub flange 11, loosely fits the bolt, but the hole in the wooden center of the wheel is smaller so that the tapered bolt drives solidly into it. Therefore, not only the compressibility of the wood but also the engagement between the bolt and the wood, effectually prevents the loosening of the bolt in the fixed hub flange.

My invention is as adaptable to the rear or driving axle 13 (see Fig. 6) as it is to the front and can likewise be used where a brake drum is employed (see Figs. 2 and 2A).

To remove either of the illustrated wheels from its hub, it is only necessary to take out the hub bolts, then slightly rock the wheel on the abbreviated hub portion. Thereby it is loosened and may be easily taken off the hub. The replacement of the wheel on the hub is an equally simple operation.

In other words it is unnecessary to remove the wheel receiving hub 2 from its axle or support. That is to say, the securing devices 9 may be removed from the outer side and the wheel removed or replaced without pulling the wheel receiving hub from the drive shaft or steering spindle as the case may be. The invention is therefore clearly distinguishable from those constructions where it has heretofore been proposed to convert say a wooden wheel construction pressed upon a permanent hub with a wire wheel to be mounted in the same manner. In such constructions it has been necessary to use a wheel puller to remove the wheel and in doing so the wooden wheel is likely to be damaged and if not damaged it is likely to become loose as there is nothing to hold it together. Furthermore, in such proposed change overs it has then been necessary to pull the permanent hub from the axle or spindle so that the fastening devices can be removed and new ones suitable for the wire wheel affixed. Such constructions are not designed, intended or adapted for ready interchange from one type of wheel to another and back again, because to restore the wooden wheel (even assuming that it is still intact) it would be necessary to again disturb the relation of the permanent hub and other parts with all the labor and inconvenience which that entails. The same remarks apply to suggested changes from a wooden wheel which has been pressed on its hub to a metal wheel mounted in like manner.

The complete and ready interchange of the different types of wheels without changing or altering the hubs, bearings, etc., is a great advantage to the automobile manufacturer; to the dealer and to the user. It greatly simplifies manufacture and assemblies in the factory because all of the other parts can be assembled without regard to the type of wheel (as distinguished from the prior practice of providing special hub constructions for the different wheels) and then any desired type mounted on the assembled hub structure.

It is a great advantage to the dealer because he can display an automobile with one type of wheel and if a customer wants delivery with wheels of another type, he can immediately (and without special tools) remove the original wheels and replace with wheels of the desired type. Thus the dealer is not required to have a stock of different wheel hub constructions and is relieved of the labor and expense of removing the various parts before referred to.

So also the present invention is a great advantage to the owner or prospective owner because he can get immediate delivery of an automobile with the particular type of wheel equipment desired. Furthermore, if at any time he should break a wheel and another one of that type is not in stock at the dealers a wheel of some other type can be substituted at least temporarily. Thus an accident is not likely to leave the motorist stranded even though he be in some rather remote place.

Many other advantages will appear to those skilled in this art.

I claim as my invention:—

1. In a demountable wheel construction, a driving axle, a wheel receiving flanged hub rigidly secured to the driving axle in operative relation, said wheel receiving hub being formed for the reception of a plurality of types of demountable automobile wheels having hub portions formed differently from each other but all complementary to the said wheel receiving hub, whereby one type of wheel may be changed for another without disturbing the operative relation of the wheel receiving hub on its axle.

2. In a demountable wheel construction, an axle, a wheel receiving integrally flanged hub secured to the axle in operative relation, said integral flange having bolt openings, said wheel receiving hub being formed for the reception of a plurality of types of demountable automobile wheels having hub portions formed differently from each other but all complementary to said wheel receiving hub and having bolt openings to register with the bolt openings in the integral flanged hub, whereby any of said types of wheels may be mounted on or demounted from the wheel receiving hub without disturbing the operative relation of the wheel receiving hub on its axle.

3. In a demountable wheel construction, a driving axle, a wheel receiving integrally flanged hub formed with an abbreviated wheel centering portion and rigidly secured to the driving axle in operative relation, said integral flange having bolt openings, said wheel receiving hub being formed for the reception of a plurality of types of demountable automobile wheels having central hub portions formed differently from each other but all complementary to said wheel receiving hub and having bolt openings to register with the bolt openings in the integral flanged hub, whereby any of said types of wheels may be mounted on or demounted from the wheel receiving hub without disturbing the operative relation of the wheel receiving hub on its axle.

4. In a demountable wheel construction, an axle, a wheel receiving integrally flanged hub formed with an abbreviated wheel centering portion and secured to the axle in operative relation, said integral flange having bolt openings, said wheel receiving hub being formed for the reception of a plurality of types of demountable automobile wheels having hub portions within the bolt circle formed differently from each other but all complementary to said wheel receiving hub and having bolt openings to register with the bolt openings in the integral flanged hub, bolts operable from the outside to secure any of the different types of wheels to the integral flange of the wheel receiving hub whereby any of said types of wheels may be mounted on or demounted from the wheel receiving hub without disturbing the operative relation of the wheel receiving hub on its axle.

5. In a demountable wheel construction, an axle, a wheel receiving integrally flanged hub secured to the axle in operative relation, said wheel receiving hub being formed for the reception of a plurality of types of demountable automobile wheels having central hub portions formed differently from each other but all complementary to said wheel receiving hub and having bolt openings, said hub having cooperating means carried by the flange to register with the bolt openings in the wheels, fastening devices operable from the outside to secure any of the different types of wheels to said integral flange whereby any of said types of wheels may be mounted on or demounted from the wheel receiving hub without disturbing the operative relation of the wheel receiving hub on its axle.

In testimony whereof, I have hereunto set my hand, this 30th day of October, 1928.

ERLE K. BAKER.